United States Patent [19]

Bartell et al.

[11] 4,204,897

[45] May 27, 1980

[54] METHOD AND APPARATUS FOR SPLICING HOSE

[75] Inventors: Jeffrey M. Bartell, Rome, N.Y.; Robert V. D'Elia, Canton, Ohio

[73] Assignee: The Goodyear Tire & Rubber Company, Akron, Ohio

[21] Appl. No.: 927,717

[22] Filed: Jul. 25, 1978

[51] Int. Cl.² ............................................. B32B 31/00
[52] U.S. Cl. .................................... 156/155; 156/158; 156/159; 156/188; 156/304
[58] Field of Search ................. 156/157–159, 156/304, 155, 187–188; 285/292, 293, 397

[56] References Cited

U.S. PATENT DOCUMENTS

| 2,503,882 | 4/1950 | Medford | 156/155 |
| 3,248,788 | 5/1966 | Goldstein | 156/155 X |
| 3,255,289 | 2/1966 | Jones | 156/304 X |
| 3,467,412 | 9/1969 | Gore et al. | 285/293 |
| 3,612,580 | 10/1971 | Jones | 285/293 |
| 3,635,504 | 1/1972 | Borden | 156/304 X |
| 3,666,586 | 5/1972 | Lacey | 156/304 X |

Primary Examiner—David A. Simmons
Attorney, Agent, or Firm—D. M. Ronyak

[57] ABSTRACT

An improved hose splice and a method and apparatus for field splicing large bore hose are disclosed. In the method, the hose covering material is removed to expose the underlying reinforcing material and the ends to be spliced are buffed preparatory to applying the splicing materials. The hose ends are mounted on a unique plaster mandrel that has a sealing elastomer wrapped in a groove at its midsection and uncured elastomeric packing is forced into the juncture of the abutted hose ends. A reinforcement textile fabric material having elastomeric gum on both surfaces is wrapped about the splice area followed by a suitable covering elastomer. The splice area is wrapped with cure and heat tapes and the splicing materials are vulcanized into an integral structure with the existing hose components. The plaster mandrel is finally broken into small pieces that may be washed out of the hose bore upon completion of the vulcanization.

5 Claims, 9 Drawing Figures

METHOD AND APPARATUS FOR SPLICING HOSE

BACKGROUND OF THE INVENTION

This invention relates to hose repair and more particularly to a method and apparatus for joining two segments of flexible hose by splicing to form a continuous long length hose. More specifically, this invention relates to an improved method and apparatus particularly suitable for field splicing operations.

Presently in the repair of hose, and more particularly to field splicing large bore hose such as irrigation hose, it is the practice to use splicing materials that do not require vulcanization, i.e., that are precured and ultimately bonded to the primary hose components by means of a chemical bond or adhesive system. This type splicing operation eliminates having to ship long lengths of hose to facilities that have vulcanization equipment available so that the splice may be cured into an integral structure with the hose components. However, such non-vulcanizing operations have not been completely successful in high pressure systems because of failures in the adhesive bond.

Further, it is the present practice to insert a mandrel into the hose bore at the juncture of the abutted ends to be spliced, so that the splicing materials may be applied without having the hose collapse. These mandrels are generally of a solid metal construction or they may also comprise an inflatable membrane and associated inflating apparatus that serve to support the splicing area. In either case, the mandrel must be removed from the hose bore upon completion of the splicing operation. Various techniques for removing the mandrel are disclosed in the art and these include (a) blowing it out by water or air pressure, (b) using an external electromagnetic device to draw the metal mandrel or other associated metallic apparatus out of the bore, and/or (c) attaching cables or the like to the mandrel to pull it out of the hose bore.

For hose lengths of 50 ft or less, removal of the mandrel poses no particular problem, however, for very long lengths on the order of hundreds of feet, insertion and removal of the mandrel is a problem that is not easily solved by present techniques. For example, irrigation hose in excess of 600 ft may be stored or wound on large spools and in this circumstance the hose must be unwound and laid out full length such that the mandrel removal apparatus may be inserted and the mandrel may later be removed by one of the beforementioned techniques.

The intent of the present invention, therefore, is to provide a method and apparatus for splicing hose wherein the splicing components are integrally vulcanized to the primary hose components to form a unitary structure that will withstand internal stresses to which the hose is subjected during service. The invention further provides a unique assemblage of apparatus for splice fabrication that are readily applied to field splicing operations and wherein the mandrel is easily removed from extremely long lengths of hose without resort to high pressure fluid, electromagnetic devices, and/or cables and the like.

In this respect the method of the invention comprises removing the covering material for a length "L" from each hose end to expose the underlying reinforcement fabric; preparing the ends by buffing the bore of the liner tube and the hose covering for a length L' and cleaning the buffed areas with an appropriate solvent; winding a length of an uncured sealing elastomer about the midpoint of a cylindrical plaster mandrel, the mandrel characterized by an annular concave groove at its midpoint with the sealing elastomer filling the groove to the outer surface of the mandrel with the circumference thereof being substantially equal to the bore circumference of the hose being spliced when positioned on the mandrel; inserting the mandrel into each hose end bore such that the ends are in an abutting relationship at the approximate midpoint of the mandrel in the area of the sealing elastomer; filling the juncture of the abutted ends with an uncured elastomeric packing for the depth of the hose liner tube and the reinforcement fabric to fill any gaps that may exist therebetween due to a mismatch of the ends; wrapping the juncture of the abutted ends with a reinforcement textile fabric material having uncured elastomeric gum on both surfaces to provide a bond with the underlying hose reinforcement for the length 2L of the exposed hose reinforcement; wrapping an uncured elastomeric cover about and completely covering the reinforcement textile fabric for the length 2L and extending an additional length in either longitudinal direction to overwrap the existing hose cover for the length L' such that the overall covering has a width of at least 2L+2L'; wrapping a nylon cure tape about the splice area in a first direction overlapping at least half the width of the tape and doubling back in the opposite direction such that the double overlap results in at least four thicknesses of the tape across the width of the splice; wrapping the splice area with a heat tape and connecting the tape to a source of electrical power to provide sufficient heat to vulcanize the underlying splice components; and removing the heat and cure tapes upon completion of the vulcanization and breaking up the plaster mandrel within the hose so that it may be washed out under normal fluid pressure.

BRIEF DESCRIPTION OF THE INVENTION

Figure 1:
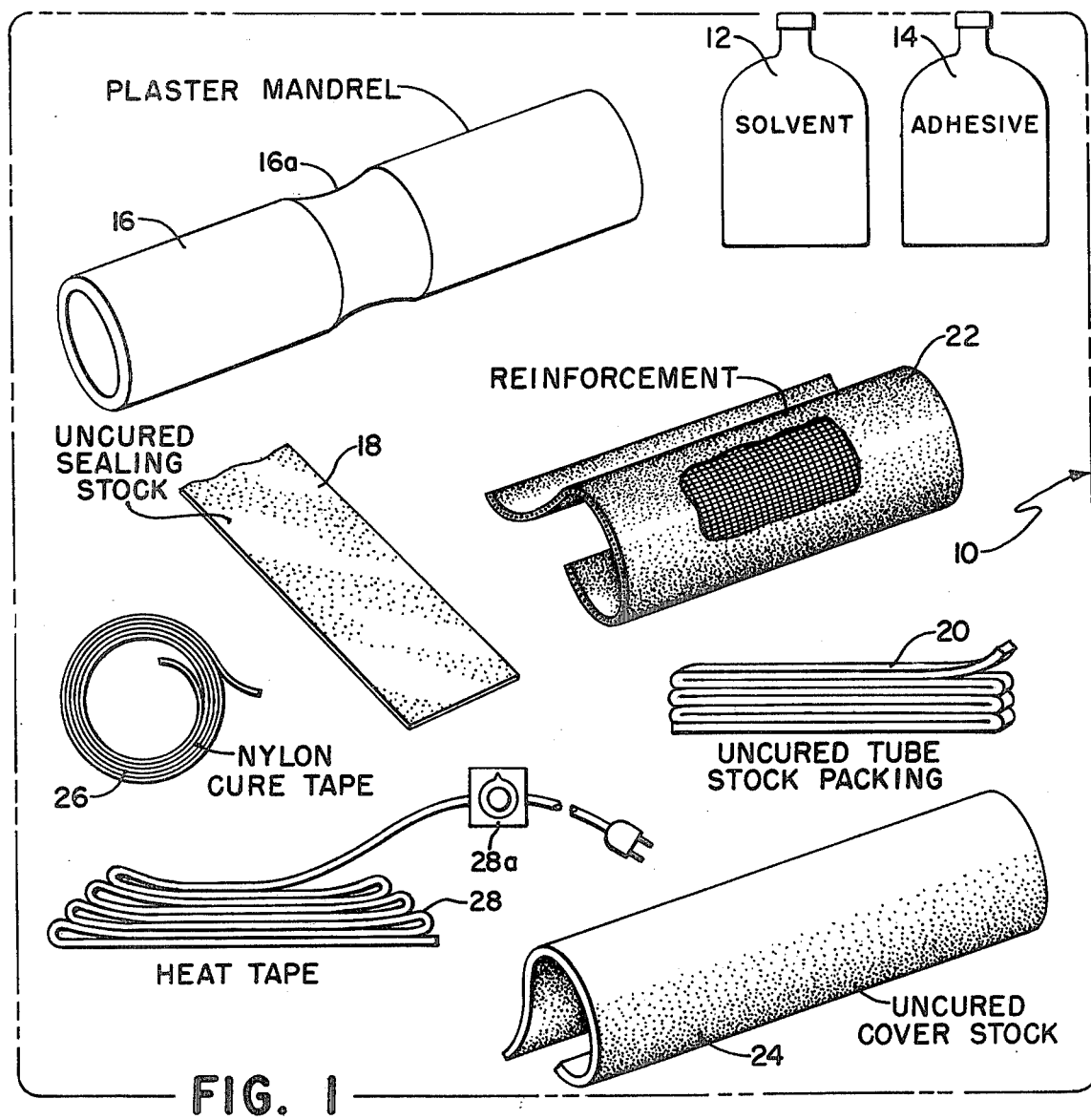
FIG. 1 illustrates the assemblage of components which comprise a kit applicable for a field splicing operation as taught by the method of this invention.

Referring to the drawings, an assemblage of components which are used to accomplish the splicing operation of the invention are illustrated in FIG. 1 and are generally indicated by reference numeral 10. These components are assembled into a hose splicing kit which includes a suitable solvent 12 for cleaning the hose surfaces to be spliced, an elastomeric adhesive 14 to facilitate bonding of various splicing materials upon curing; a mandrel 16 for supporting the abutted hose ends while being spliced; a length of uncured elastomeric tube stock 18 for effecting a seal at the juncture of the abutted hose; a length of uncured elastomeric tube stock packing 20 for filling the gap between the abutted ends; a sheet of fabric reinforcement material 22; a sheet of uncured elastomeric cover stock 24; a length of a typical nylon cure tape 26; and a heat tape 28. Additionally, an insulating material (not shown) may be provided for increasing the efficiency of the curing operation as will be more fully understood from the description of FIGS. 2a–2g.

The solvent 12 may be any of the well known materials on the market, while the adhesive 14 is a material manufactured by The Goodyear Tire & Rubber Company, Akron, Ohio, and designated Adhesive M908C. The adhesive provides a complete integration of the splicing materials upon curing by the application of heat and pressure.

The mandrel 16 is unique to this invention and is considered novel in the hose splicing art in that it comprises a cylinder of plaster material. The plaster exhibits sufficient strength characteristics to support the splicing area of the abutted hose when inserted into the hose bore but which may also be broken into small pieces when subjected to concentrated blows. Because the invention comprises a vulcanization process, the plaster is dried at 150° F. for a approximately thirty hours to remove any excess moisture. For a particular size hose to be spliced, the mandrel has an outside diameter (O.D.) substantially equal to the hose bore diameter (I.D.) and is further characterized by an annular concave recess, groove or depression 16a at its approximate midpoint. The annular groove 16a is of a shape to readily accept the sealing elastomer 18 in mating relationship therewith such that when the mandrel is inserted into the hose bore the abutted ends meet at the midpoint of the mandrel in the area of the groove 16a having the sealing elastomer positioned therein and there is little or substantially no distortion of the abutted hoses. The outer surface of the mandrel may also be treated with a release agent such that upon being vulcanized the sealing elastomer does not stick to the plaster.

The sealing elastomer 18 is preferably an uncured compound which may or may not be similar to the hose liner tube compound to be spliced but it must be chemically compatible therewith. The sealing elastomer may be extruded in long lengths and to any desired cross sectional configuration and cut to length for a particular size hose to be spliced. The elastomer 18 may, for example, be a couple of inches wide to adequately cover the juncture of the abutted hose ends and when wrapped on the mandrel, and inserted into the hose bore it is cradled in the groove 16a to thus depend into the bore of the hose. The flat surface of the material faces radially outwardly so as to be in contact with the hose bore surface and upon being vulcanized, the sealing elastomer presents a convex or tapered configuration to the bore with the greater thickness at the longitudinal center 18a of the wrapped material than at the edges 18b.

The uncured tube stock packing 20 is also preferably of the same material as the sealing elastomer 18 and it is an extrusion of a small cross section so as to serve as a packing between the abutted ends of the hose sections to be spliced. Its purpose is to fill any gaps that exist at the juncture of the abutted ends due to a mismatch between the end surfaces.

The reinforcement material 22 is a textile fabric having a tie gum frictioned or coated on one or both surfaces and may also include an appropriate elastomeric adhesive on one or both surfaces, which when exposed to heat, effects an integral bond with the adjacent splicing materials.

The uncured elastomeric cover stock 24 may or may not be identical to the original hose cover stock but it must be of a type compound to be compatible therewith. Preferably the cover stock is the same compound as the hose to be spliced so as to insure a complete bond therebetween upon curing under heat and pressure.

The cure and heat tapes 26 and 28 respectively are typical in the marketplace, the cure tape being preferably of shrinkable nylon that will effect a pressure on the splice joint upon the application of heat and the heat tape is of an electrical capacity such as to provide sufficient heat to the splicing materials to effect curing same.

Figure 2A:
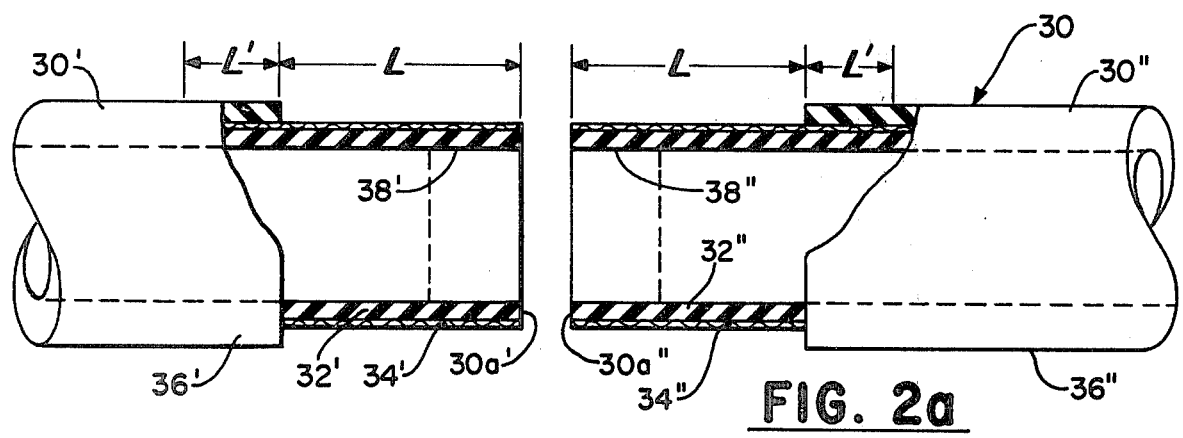
FIGS. 2a–2g illustrate the method of splicing in accordance with the invention.
Figure 2B:
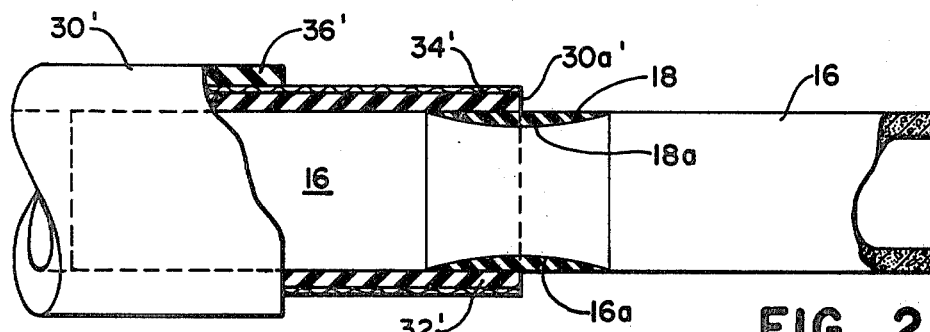
Figure 2C:
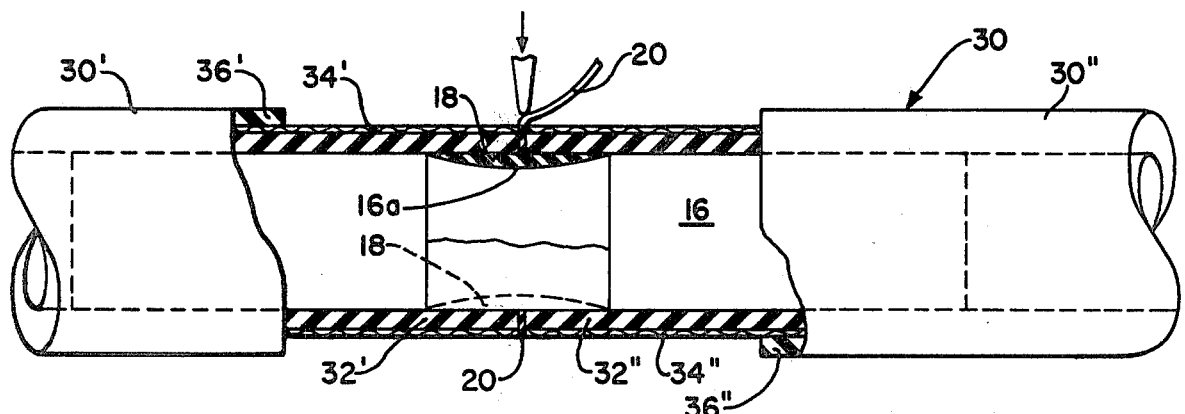

Turning now to FIGS. 2a–2g the method of the invention will be described in detail with the hose to be spliced generally indicated by reference numeral 30. For the purpose of the description the one hose portion will be referenced by a single primed (') numeral while the other portion will be referenced by a double primed (") numeral, identical parts of the hose portions carrying the same reference numeral. In FIG. 2a hose portions 30' and 30" are shown in approximate abutting relationship preparatory to splicing and the hose is typically a large bore irrigation hose comprising an elastomeric inner liner tube 32', 32", a textile reinforcement ply 34', 34" and an outer elastomeric cover ply 36', 36". Preparatory to splicing, the ends 30a', 30a" are cut square so that when positioned in an abutting relationship they match as closely as possible and no large gaps are present between them and a portion of the cover ply 36', 36" is stripped off to expose the underlying fabric reinforcement for a length L sufficient for the splice. The hose bore 38', 38" is then buffed and cleaned with solvent 12 so as to present an adhesion surface for the sealing elastomer 18 and also an additional short length L' of the hose cover 36', 36" is buffed and cleaned with solvent to provide an adhesion surface for the elastomeric cover stock 24.

Figure 2D:
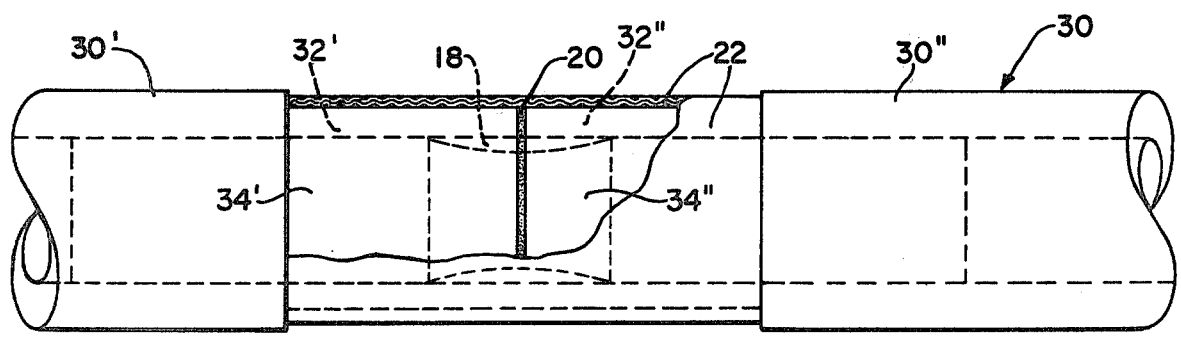

The sealing elastomer 18 is now mounted on the plaster mandrel 16 in the concave portion 16a and wrapped thereabout to fill the portion 16a and substantially matching the diameter of the mandrel. The mandrel 16 is inserted into the hose bore 38', 38" of each hose end 32', 32" until the ends meet in abutting relationship at the approximate midpoint of the mandrel in the area of the sealing elastomer 18 as clearly shown in FIGS. 2b and 2c. So that no gaps are present between the abutted hose ends 30a' and 30a", the uncured tube stock packing 20 is forced therebetween until it forms a fill that will become integral with the sealing elastomer 18 and the hose liner tubes 32', 32" upon vulcanization. The gap that would normally exist at the juncture of the ends is actually smaller than shown but for the purpose of this description it is greatly enlarged in the illustration. Next, the area of the splice designated 2L in FIG. 2d is coated with elastomeric adhesive 14 and wound with the fabric reinforcement material 22. If the outer surface of the fabric reinforcement 22 does not already include an adhesive it is coated with an elastomeric adhesive 14 including the areas of the hose cover 36' and 36" that were buffed and designated by lengths L'. The uncured elastomeric cover stock 24 is next wrapped about the splice area and extends for about the length 2L+2L' shown in FIG. 2d so as to overlap the original hose cover 36' and 36".

Figure 2E:
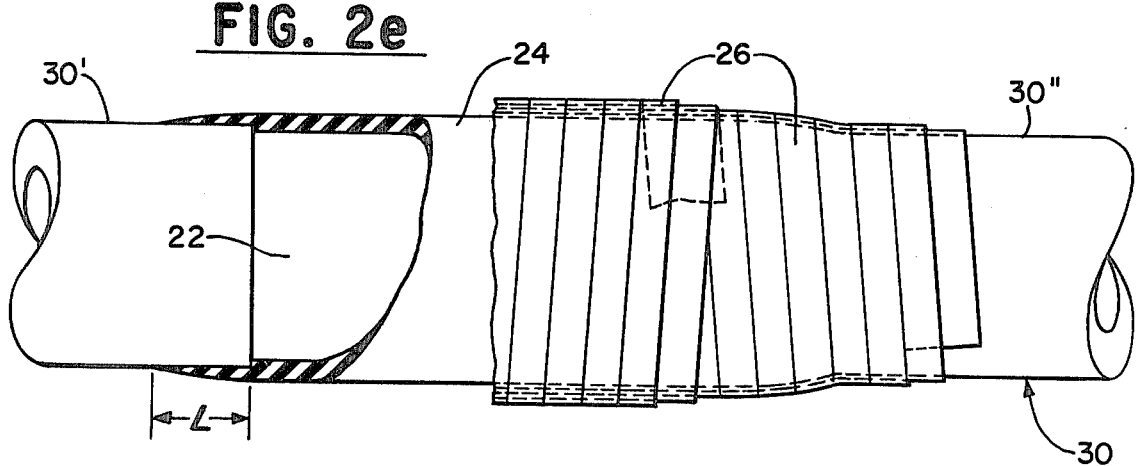
Figure 2F:
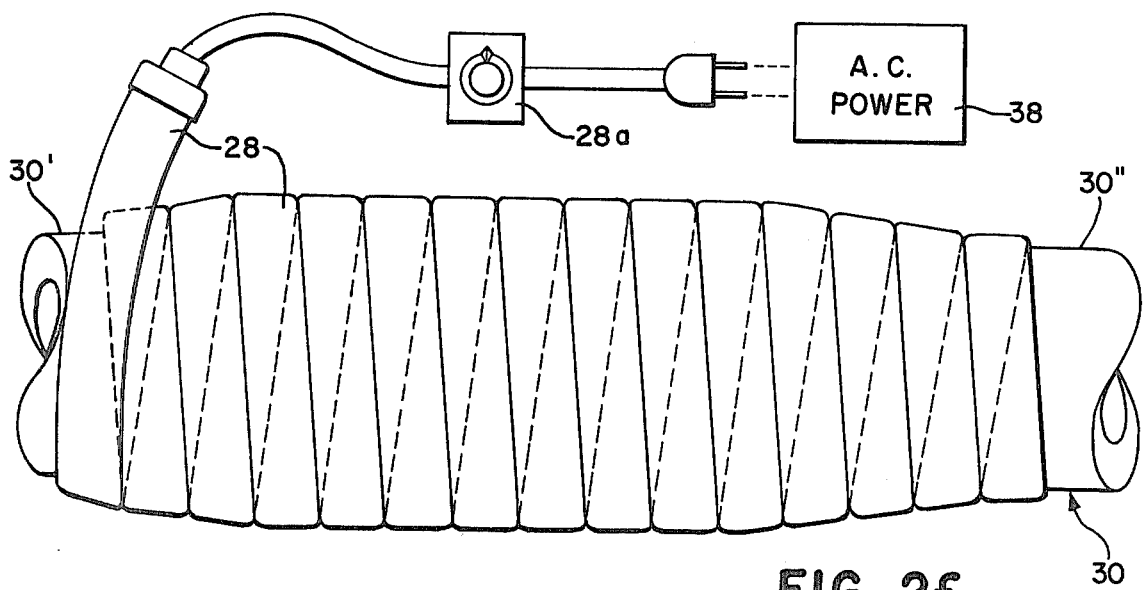

The hose splicing materials are now ready for vulcanization and to accomplish this a typical nylon cure tape 26 is spiral wrapped about the splice area in an overlapping, double-warp, opposite-hand relationship such that the resultant layup is four plies thick as clearly shown in FIG. 2e. This insures that upon the application of heat, shrinkage of the tape will effect a substantial pressure on the splice during the cure. In order to provide the heat for vulcanization, a heat tape 28 is wrapped about the splice area in a conventional manner and connected to a source of electric power 38. In some instances an insulating layer may be wrapped over the heat tape to improve the efficiency of the vulcanization operation. In this respect it was found that without such insulation the curing time was increased due to heat loss to the atmosphere. A suitable control 28a may also be provided to vary current through the tape and the heat generated to thus control the cure time. A cure time of approximately 120 minutes was found adequate for a hose having a single ply of reinforcement.

Figure 2G:
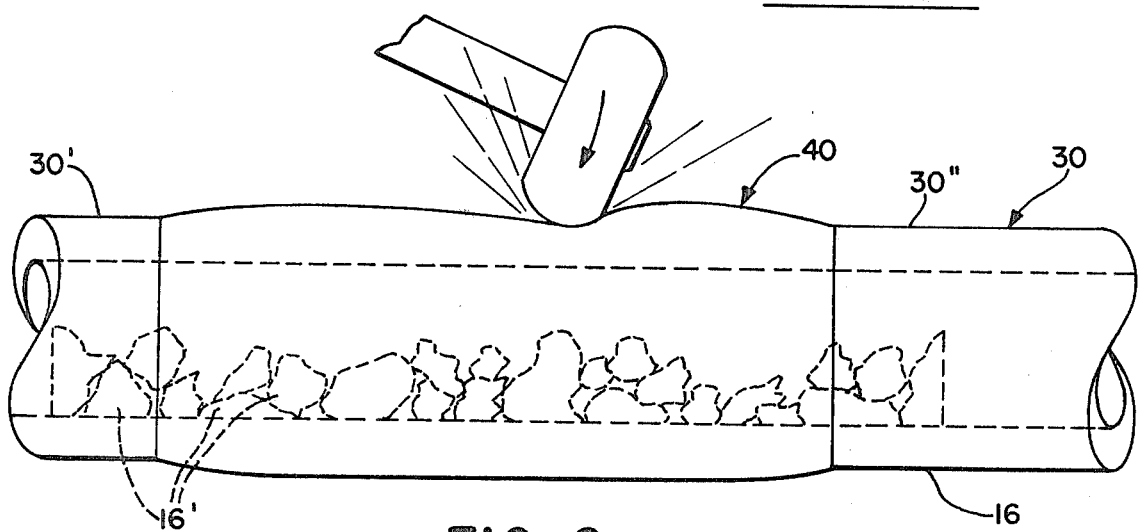

Upon completion of the cure, the heat and cure tapes are removed. Next, the mandrel must be removed from the bore of the hose and in contrast to prior art practices, no sophisticated apparatus or high pressure fluid is required to blow out the mandrel. In accordance with this invention and as shown in FIG. 2g, the plaster mandrel may be broken by blows or otherwise crushed into small enough particles 16' such that they may be washed out of the hose under normal pressures. In this respect, the release agent on the outer surface of the mandrel provides for the release of the plaster from the elastomer and thorough washout of the particles is accomplished.

Figure 3:
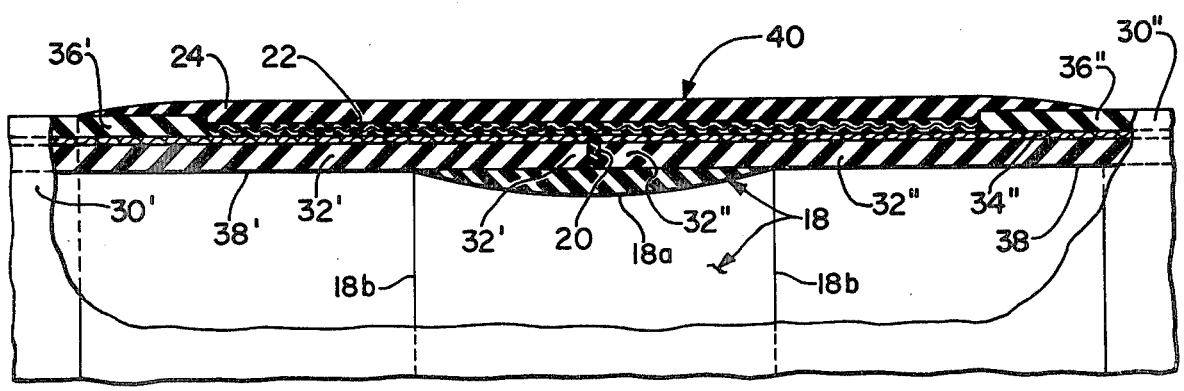
FIG. 3 is a partial sectional elevational view showing two segments of hose spliced in accordance with the method as described with reference to FIGS. 2a–2g.

With reference to FIG. 3, a splice made in accordance with the invention is shown in a broken-away, longitudinal sectional view and is generally indicated by reference numeral 40. In contrast to prior art splices, the sealing elastomer 18 depends into the bore of the hose. The central thickened portion 18a tapers to the edges 18b presenting a smooth transition with the hose liner tube 32', 32" and the resultant restriction to the flow of liquid through the hose bore 38', 38" is not sufficient to cause any noticeable adverse affects, especially in large bore irrigation hose having bore diameters in excess of 2 inches. As clearly illustrated in the drawing, the tube stock packing 20 fills any gap area between the hose ends 32a' and 32a" and upon vulcanization the relationship of the sealing elastomer 18, the hose liner tube 32, and the packing 20 is such that the hose liner tube 32 retains a substantially longitudinal orientation and is not deformed radially inwardly or outwardly due to the splicing materials. This relationship results in a spliced hose having a smooth outer cover transition in the area of the splice.

While certain representative embodiments and details have been shown for the purpose of illustrating the invention, it will be apparent to those skilled in this art that various changes and modifications may be made therein without departing from the spirit or scope of the invention.

What is claimed is:

1. A method of splicing two segments of hose the ends of which are in abutting relationship to form a juncture therebetween, said hose comprised of an inner elastomeric liner tube, and at least one ply of a textile reinforcement fabric, and an elastomeric cover, the method comprising the steps of:

removing the covering material for a length "L" from each hose end to expose the underlying reinforcement fabric;

preparing the ends by buffing the bore of the liner tube and the hose covering for a length L' and cleaning the buffed areas with an appropriate solvent;

winding a length of an uncured sealing elastomer about the midpoint of a cylindrical plaster mandrel, the mandrel being characterized by an annular concave groove at its midpoint, the sealing elastomer filling the groove to the outer surface of the mandrel, the circumference of the outer surface of the mandrel being substantially equal to the bore circumference of the hose being spliced when positioned on the mandrel;

inserting the mandrel into each hose end bore such that the ends are in an abutting relationship at the approximate midpoint of the mandrel in the area of the sealing elastomer;

filling the juncture of the abutted ends with an uncured elastomeric packing for the depth of the hose liner tube and the reinforcement fabric to fill any gaps that may exist therebetween due to a mismatch of the ends;

wrapping the juncture of the abutted ends with a reinforcement textile fabric material having uncured elastomeric gum on both surfaces to provide a bond with the underlying hose reinforcement for the length 2L of the exposed hose reinforcement;

wrapping an uncured elastomer cover about and completely covering the reinforcement textile fabric for the length 2L and extending an additional length in either longitudinal direction to overwrap the existing hose cover for the length L' such that the overall covering has a width at least 2L+2L';

wrapping a cure tape about the splice area such that the multiple thicknesses of the tape result across the width of the splice;

heating the splice area to vulcanize the underlying splice components; and removing cure tape upon completion of the vulcanization and breaking up the plaster mandrel within the hose so that it may be washed out under normal fluid pressure.

2. The method as set forth in claim 1 wherein an elastomeric adhesive is applied prior to and after wrapping of the textile fabric reinforcement material.

3. The method as set forth in claim 1 wherein the length L' is at least 1.0 inch (2.54 cm).

4. The method as set forth in claim 1 wherein the length L is at least 3.0 inches (7.62 cm).

5. The method as set forth in claim 1 wherein the sealing elastomer is at least 1.5 inches (3.81 cm) wide and at least 1/16 inch (0.15 cm) at the thickest part of its cross section.

* * * * *